J. LACHT.
ROACH TRAP.
APPLICATION FILED JULY 1, 1916.
1,208,987.
Patented Dec. 19, 1916.
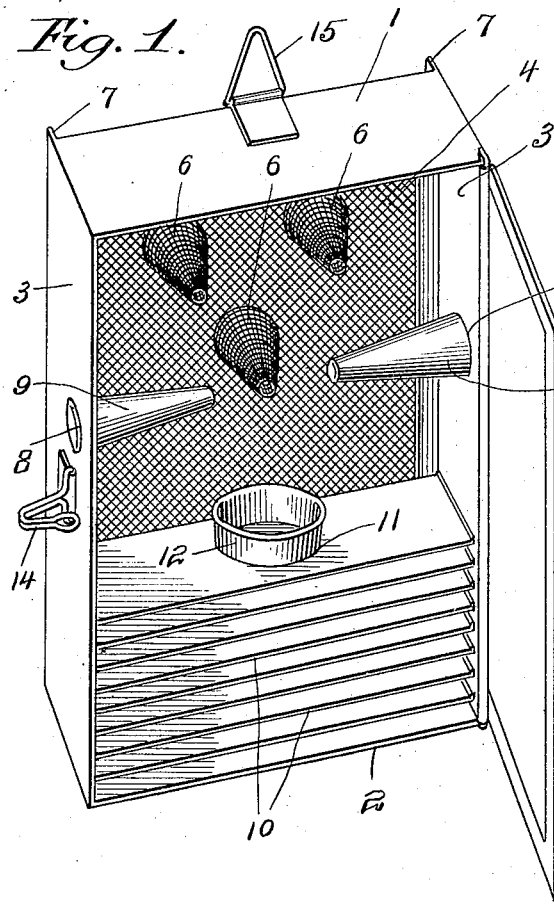
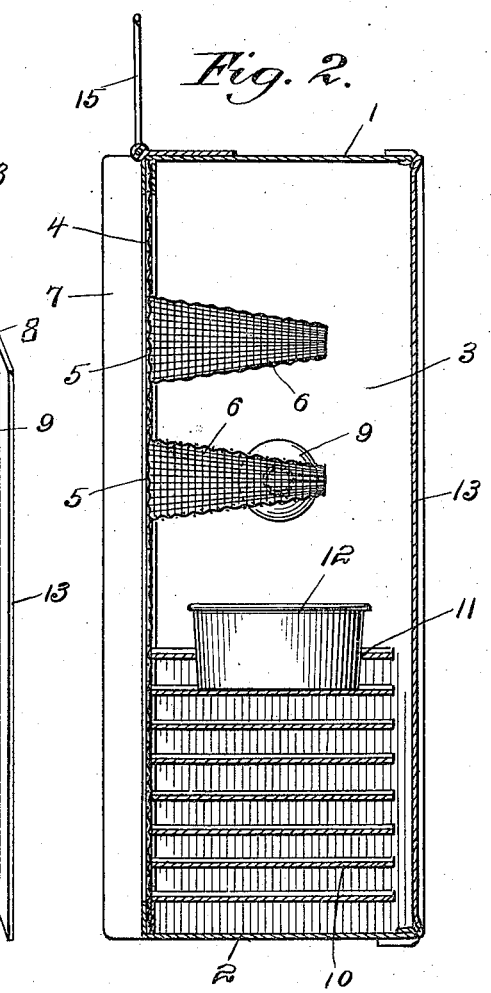
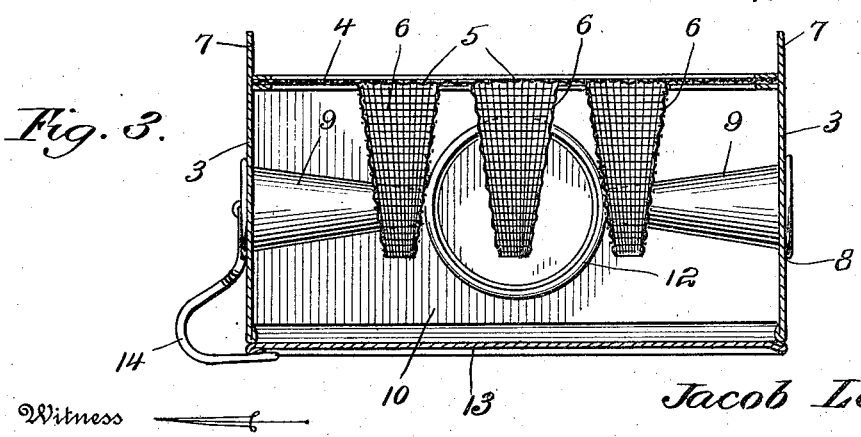
Inventor,
Jacob Lacht.
By Victor J. Evans,
Attorney.
Witness

UNITED STATES PATENT OFFICE.

JACOB LACHT, OF LONG ISLAND CITY, NEW YORK.

ROACH-TRAP.

1,208,987.     Specification of Letters Patent.      Patented Dec. 19, 1916.

Application filed July 1, 1916. Serial No. 107,077.

*To all whom it may concern:*

Be it known that I, JACOB LACHT, a subject of the Czar of Russia, residing at Long Island City, in the county of Queens and State of New York, have invented new and useful Improvements in Roach-Traps, of which the following is a specification.

This invention relates to improvements in insect traps and is more particularly designed for the trapping of roaches.

The chief characteristic of this invention is to provide a device of this character which is adapted to trap the insects upon the side wall of the room, the device being provided with entrance passages disposed adjacent the wall and spacing elements for maintaining the passages in spaced relation to the wall whereby the insects may have ready access thereto in entering the trap.

Another characteristic of this invention resides in the provision of a device of the above described character having a plurality of darkened compartments in which the insects may secret themselves and thus minimizing the liability of the insects escaping through the entrance passages.

Another object of this invention is to provide a device of this character which contains the desirable features of simplicity, durability and efficiency, and furthermore a device which may be manufactured at a nominal cost.

Other objects of the invention will appear as the specification is read in connection with the accompanying drawings, in which:—

Figure 1 is a perspective view of the trap, the door being shown in open position. Fig. 2 is a vertical section. Fig. 3 is a horizontal sectional view.

Referring to the drawings in detail, my invention comprises a casing formed of any suitable material such as metal or the like and which is preferably of rectangular formation. The casing includes a top and bottom wall 1 and 2 respectively, side walls 3, and a rear wall 4. The rear wall 4 is formed of reticulated material such as wire screen or the like and is provided at a point adjacent its upper end with circular openings 5 in each of which are mounted the larger end of a frusto-conical foraminous member 6, the member 6 being disposed within the casing and providing entrance passages for the insects. In this instance I have shown three of the members 6 which are arranged in the form of a triangle but I wish it to be clearly understood that any number or arrangement may be used without departing from the spirit of this invention.

The side walls 3 are extended upon their rear vertical edges to provide the flanges 7, the flanges serving to maintain the rear wall 4 of the trap in spaced relation to the walls of a room as will be hereinafter described. It will be noted that the flanges 7 are coextensive of the side walls 3 so that the insects will be confined between the wall of the room and the rear wall 4 through the entire length of the latter. The side walls 3 are provided at opposite points adjacent their upper ends with circular openings 8 in which are mounted the frusto-conical members 9, the openings receiving the larger end of the members while the restricted ends are disposed within the casing and preferably at right angles to the members 6.

Mounted within the casing and preferably secured to the side walls 3 are transversely extending plates or shelves 10 which are in this instance of rectangular formation and are disposed below the frusto-conical members 6 and 9. The shelves 10 are arranged in superposed relation to each other and are of such a width as to terminate rearwardly of the front side of the casing as is clearly shown in Fig. 2 of the drawings. It will be seen from this construction that the compartments formed by the shelves are all in communication with each other and access may be readily had to the compartments through the front of the casing. The uppermost shelf 10 is provided with a circular opening 11 at its medial portion in which is mounted a bait tray or cup 12, the tray being held in projected position within the opening by means of the adjacent shelf as is clearly shown in Fig. 2 of the drawings.

The casing is adapted to have its front side closed by means of a door 13 which is hingedly connected to the vertical edge of one of the side walls 3, the door being locked in closed position by means of a latch 14 which is secured to the opposite side wall as is shown in Fig. 1 of the drawings. In this instance I have shown the latch 14 formed of a single piece of wire which is pivotally connected to the casing, the latch being of substantially U-shape formation and having its free end engaging the cover as disclosed in Fig. 3.

To support the trap in suspended position upon the side wall of a room, I provide the top wall 1 with a pivoted eye 15, which is adapted to receive a nail or other supporting means as will be understood.

In operation, the trap being suspended upon the side wall of a room by means of the eye 15, the flanges 7 will engage the wall and thereby hold the rear wall 4 in spaced relation to the wall of the room as will be understood. The insects in traversing the walls will be directed between the flanges 7 and upon the foraminous wall 4 and subsequently into and through the foraminous member 6 thus trapping the insects within the casing. It is a well known fact that an insect which habituates dwellings, and especially roaches have a tendency to seek secluded places and especially dark corners. With this in mind, the spaced shelves 10 have been provided to form the darkened compartment in which the roaches may collect, thus minimizing the liability of the roaches from attempting to escape through the restricted passage way.

It will of course be understood that when the trap is in active position, the door 13 is closed whereby the intersections between the shelves will be darkened. The roaches will have access to all of the compartments, it being noted that the shelves are of such width as to terminate rearwardly of the door 13 as was previously described. In cleaning the trap, the door may be moved to open position whereby the insects may be readily dumped or removed from between the shelves and the tray 12 is refilled with bait. In providing the side walls 3 with the members 9, I have devised a further means for trapping insects in the event that they accumulate upon the side walls of the casing.

It is thought from the foregoing taken in connection with the accompanying drawings, that the construction and operation of my device will be apparent to those skilled in the art, that minor changes in the size, shape and proportion and minor details of construction may be made without departing from the spirit and scope of the appended claims.

What I claim is:—

1. An insect trap comprising a casing having a rear wall formed of reticulated material and disposed inwardly beyond the adjacent edges of the side walls, the free edges of the side walls serving to bear against the surface and to space the reticulated rear wall uniformly from said surface, and trap members having their inlet ends opening through and in coincidence with the rear wall of the casing.

2. An insect trap comprising a casing having a rear wall formed of reticulated material and disposed inwardly beyond the adjacent edges of the side walls, the free edges of the side walls serving to bear against the surface and to space the reticulated rear wall uniformly from said surface, and a series of spaced shelves arranged within the casing and extended from the reticulated rear wall, said shelves being of less width than the similar dimensions of the casing to provide a space between the forward edges of said shelves and the adjacent wall of the casing.

3. An insect trap comprising a casing having a rear wall formed of reticulated material and disposed inwardly beyond the adjacent edges of the side walls, the free edges of the side walls serving to bear against the surface and to space the reticulated rear wall uniformly from said surface, and a series of spaced shelves arranged within the casing and extended from the reticulated rear wall, said shelves being of less width than the similar dimensions of the casing to provide a space between the forward edges of said shelves and the adjacent wall of the casing, one of said shelves being formed with an opening and a bait receptacle resting within the said opening and upon the immediately adjacent shelf.

In testimony whereof I affix my signature.

JACOB LACHT.

Copies of this patent may be obtained for five cents each, by addressing the "Commissioner of Patents, Washington, D. C."